United States Patent

Dalcourt et al.

[11] Patent Number: 5,957,151
[45] Date of Patent: Sep. 28, 1999

[54] AUTOMATIC PRESSURE REGULATING VALVE

[76] Inventors: René Dalcourt, 250 De La Mennais, Louiseville, Quebec, Canada, J5V 2T8; Germain Rinfret, 112 Larivée, Répentigny, Quebec, Canada, J6A 4P8

[21] Appl. No.: 09/024,957

[22] Filed: Jan. 23, 1998

[51] Int. Cl.[6] ................................................. F16K 15/20
[52] U.S. Cl. ............................................. 137/225; 251/75
[58] Field of Search ................................... 137/224, 225, 137/232, 512.3; 251/75

[56] References Cited

U.S. PATENT DOCUMENTS

| | | | |
|---|---|---|---|
| 1,873,303 | 8/1932 | De Langie | 137/225 |
| 2,024,780 | 12/1935 | Ruckman | 137/225 |
| 2,326,998 | 8/1943 | Hosking | 137/232 |
| 2,521,891 | 9/1950 | Beams | 251/75 |
| 2,712,427 | 7/1955 | Welborn et al. | 251/75 X |
| 2,757,616 | 8/1956 | Hill et al. | 137/512.3 X |
| 3,069,125 | 12/1962 | Hewitt, Jr. | 251/75 X |
| 3,504,849 | 4/1970 | Quinn | 251/75 |
| 3,703,188 | 11/1972 | Wagner | 251/75 X |
| 3,794,075 | 2/1974 | Stoll et al. | 251/75 X |
| 5,293,919 | 3/1994 | Olney et al. | 137/225 X |
| 5,411,051 | 5/1995 | Olney et al. | 137/225 |

FOREIGN PATENT DOCUMENTS

| | | | |
|---|---|---|---|
| 848756 | 9/1952 | Germany | 137/225 |

*Primary Examiner*—John Rivell
*Assistant Examiner*—Meredith H. Schoenfeld
*Attorney, Agent, or Firm*—Eric Fincham

[57] ABSTRACT

A simple and frictionless pressure limiting valve assembly for use in pneumatic tire valves wherein a snap diaphragm is movable into and out of a sealing relationship with a valve member by means of the snap action of a snap action diaphragm. The snap action diaphragm may be biased by a means if desired to permit inflation of the pneumatic tire until a desired pressure is reached whereby the snap action diaphragm reverses itself and closes the air flow passageway. This inexpensive assembly only has a few parts. Some preferred embodiments are easy to incorporate (add to) in a conventional tire valve assembly and some others have their specific design. The effective point of activation of the snap action of the snap action diaphragm may be calibrated to precise values.

17 Claims, 8 Drawing Sheets

AUTOMATIC PRESSURE REGULATING VALVE

BACKGROUND OF THE INVENTION

The present invention relates to valve structures for pneumatic tires and more particularly, relates to a valve structure that enables inflation of a pneumatic device in one simple operation to a predetermined pressure, it also prevents overpressure during inflation, regardless of the air supply pressure.

The use of tire valves for pneumatic tires is well known in the art and a substantially conventional structure has evolved, particularly for automobile pneumatic tires. Generally, the commercially used tire valves are one-way stem valves permitting the inflation of the tire while preventing the egress of air therefrom under normal conditions.

The importance of obtaining prescribed tire pressure is becoming increasingly recognized. Thus, it is well known that proper tire pressure is essential in order to achieve maximum safety and efficient operation of the vehicle. Thus, under-inflated tires substantially decrease gas mileage leading to increase pollution and increase wear on the tires. Over inflation, on the other hand, is equally undesirable, as it will lead to uneven tire wear and possible poor handling of the vehicle.

Many of the components of the modem vehicle are designed to operate together under predefined conditions, such components including the tires, springs, shocks, steering mechanism, etc. Improper tire inflation pressures can, as mentioned above, lead to excessive wear on such components as well as causing poor handling and/or braking.

In order to overcome the above, it has been proposed in the art to provide various tire pressure indicating devices for use with the conventional valve structure on the pneumatic tire. Such devices are shown, for example, in U.S. Pat. No. 3,650,150 to Eccles and U.S. Pat. No. 5,365,967 to Moore. While such devices do perform the function of providing a tire pressure indicator, it will be understood that the conditions under which a vehicle operates are severe and damage to mechanisms can occur. A problem associated with some known valve assemblies is the inherent cost of such assemblies. Many of the pressure indicating devices known in the prior art utilize a number of components and therefore are relatively expensive for the marketplace.

Drivers frequently ignore recommendations from tire manufacturers and road safety organizations to check pressure at least once a month, because of the hassle of performing the operation. The necessity of having a simple device not subject to malfunction and which prevents over inflation and which requires only one simple operation would be desirable.

With such a device, it would be possible for the vehicle owner simply to inflate the tires at regular intervals, while being assured that the proper pressure is attained.

A further advantage of such a type of structure is that the desired pressure will be set in conformity with the manufacturer's recommendations, thereby eliminating both the need for the vehicle owner to ascertain the desired pressure and also to prevent the intentional and/or inadvertent over inflation of the tire.

SUMMARY OF THE INVENTION

It is an object of the present invention to provide a tire valve having an over inflation prevention device associated therewith.

It is a further object of the present invention to provide a valve structure that limits the pressurization or inflation of a tire regardless of the air supply pressure flow and which device is simple to manufacture.

It is a further object of the present invention to provide a valve structure assembly having an over inflation prevention device built in.

It is a further object of the present invention to provide a valve structure assembly including a bypass air passageway therein, which bypasses the pressure limiting valve assembly.

It is a further object of the present invention to provide an arrangement of a valve structure assembly including a slightly offset conduit, permitting access to means to adjust the effective pressure level of the pressure limiting valve assembly from the exterior.

It is a further object of the present invention to provide a valve structure assembly with a pressure limiting valve assembly, which device is simple to manufacture and readily adaptable to a conventional tire valve.

It is a further object of the present invention to provide a pressure limiting valve assembly which uses a single stable position snap action diaphragm.

It is a further object of the present invention to provide a pressure limiting valve assembly, which uses a bi-stable (two position) snap action diaphragm, where the total forces in the closed chamber portion are larger than the internal resistance of the snap action diaphragm.

It is a further object of the present invention to provide a pressure limiting valve assembly which can be used in one position defined as a positive position or in a reversed position, defined as a negative position.

It is a further object of the present invention to provide means to set the effective point of activation of the snap action diaphragm in the pressure limiting valve assembly.

It is a further object of the present invention to provide a valve assembly having signaling means when a predetermined pressure is reached.

According to one aspect of the present invention, there is provided a pneumatic valve assembly comprising a housing having an air passageway extending therethrough; a tire stem valve mounted in an upper portion of the air passageway; a pressure limiting valve assembly mounted in the air passageway downstream from the tire stem valve, the pressure limiting valve assembly comprising a chamber having an upstream air inlet from the air passageway; a downstream air outlet from the chamber to the air passageway; a valve seat surrounding one of the air outlet and air inlet; a valve member seatable on the valve seat; a snap action diaphragm extending across the chamber and dividing the chamber into a first open chamber portion and a second closed chamber portion; the first open chamber portion having the air inlet and the air outlet; and a valve stem connected to the valve member and to the snap action diaphragm.

According to a further aspect of the present invention, there is provided a pneumatic valve assembly comprising a housing having an air passageway extending therethrough; a tire stem valve mounted in an upper portion of the air passageway; a pressure limiting valve assembly mounted in the air passageway downstream from the tire stem valve, the pressure limiting valve assembly comprising a chamber having an upstream air inlet from the air passageway; a downstream air outlet from the chamber to the air passageway, a snap action diaphragm extending across the chamber and dividing the chamber into a first upper chamber portion and a second lower chamber portion, the diaphragm having at least one aperture located centrally thereof to permit gas communication between the first upper chamber and the second lower chamber; means within the second lower chamber for sealing the at least one aperture when the snap action diaphragm moves into a position within the second lower chamber; and bellow means enclosing an air passageway extending between the at least one aperture and the downstream air outlet.

In greater detail, the pneumatic tire valve assembly of the present invention is designed to operate such that when a desired preset pressure is achieved within the pneumatic tire, a snap action diaphragm exposed to the air pressure functions to close a limiting valve to prevent further inflation of the tire.

While reference is made in here to a pneumatic tire, it is understood that the invention may also be practiced with any structure wherein the prevention of over inflation is desired.

In one aspect of the present invention, the snap action diaphragm assembly of the present invention incorporates the use of spring means in the closed chamber portion to bias the action of the snap action diaphragm and associated valve to a position so as to permit inflation of the tire. However, when the desired pressure is achieved, the air pressure acting on the snap action diaphragm overrides instantly the total resistance from the closed chamber portion and the valve closes. With the valve open, the snap action diaphragm works progressively during its first half-stroke displacement due to inflation and, reaches an effective point where a snap action engages to close instantly the valve: the second half-stroke. Naturally, the term "half-stroke" does not necessarily comprise an exact one half of a stroke.

The advantage of using a snap action diaphragm assembly is that they can be manufactured to have precise values. Also, the snap action diaphragm can perform a very high number of operations under repeatable conditions. There is also no friction component present. Since the assembly can be entirely incorporated in a housing containing a conventional tire stem valve, exposure to undesirable conditions is avoided. Also, the minimal number of inexpensive parts provides a relatively inexpensive structure.

The open chamber portion is one wherein the inflation air pressure is transmitted. This open chamber portion includes the inlet which permits the passage of air from the exterior inflation source; it also contains a fluid outlet, which permits the passage of air from the inflation source to the tire or other chamber to be inflated. The open chamber portion has means for sealing or closing the passageway.

The closed chamber portion is that portion on which the exterior forces from the open chamber portion are transferred or applied through the snap action diaphragm. This section may contain means for adjusting the effective point of the activation of the snap action diaphragm and means confining the limit of the maximum displacement, as well as for ensuring proper functioning thereof The activation of the snap action diaphragm will vary depending on the preselected internal stress and the internal chosen pressure (air or gas) in the closed portion. Means for calibrating the effective point of activation of the snap action of the snap diaphragm at which the snap action diaphragm will reverse instantly from the open chamber portion to the closed chamber portion may include various means: e.g. springs, backing members, compressible material, etc.

In one particular embodiment, means of calibrating the effective point of activation of the snap action of the snap action diaphragm may utilize a predetermined resistance spring, the pressure of which may be adjusted. It is understood, naturally, that the final point at which the snap action diaphragm snaps, depends on factors such as the internal pressure and resistance to the snap action diaphragm in the closed chamber portion, the material utilized, the design, etc.

As will be understood, in using a two stable position (bi-stable) snap action diaphragm, the total forces in the closed chamber portion must be larger than the internal resistance of the snap action diaphragm if one wants to assure automatically the return movement thereof when the forces in the open chamber portion are diminished. This action is naturally required to permit the valve member seated on the valve seat to move to an open position to permit inflation of the tire.

In the case of a single stable position snap action diaphragm, because of its natural propensity to come back to its initial rest position when the pressure in the open chamber portion has sufficiently diminished, this diaphragm snaps back automatically to its initial position.

The closed chamber portion is preferably sealed to eliminate any external factors which might affect the calibration of the effective point of activation of the snap action of the snap action diaphragm. When means to adjust the point at which the snap action diaphragm snaps are utilized, it must be ensured that such means do not effect the sealing of the closed chamber portion. In all instances, the open and closed chamber portions are sealed one from another.

When one utilizes the embodiment with an offset conduit, the sealing of the closed portion with the exterior is somewhat compromised; however, the open and closed chamber portions are air tightly sealed one from another.

It is also important that the integrity of the snap action diaphragm be preserved. In those situations where the potential pressures from supply air source could attain pressures sufficiently high to damage the snap action diaphragm, limiting means to limit the movement of the snap action diaphragm may be incorporated in the closed chamber portion. Again, such means may be selected from known elements.

As aforementioned, in certain embodiments, there is provided means for adjusting the pressure at which the snap action diaphragm is operative to reverse positions. As will be described in greater detail hereinbelow, the means for adjustment may be accessible either from the interior of the structure or from the exterior thereof The control mechanism of the over inflation device (pressure limiting valve assembly) is said to be positive when, the pressure limiting valve moves and closes in the same direction as the entering air while inflating.

This control mechanism of the over inflation device (pressure limiting valve assembly) is said to be negative, when the pressure limiting valve moves and closes in the opposite direction of the entering air while inflating.

A single stable position snap action diaphragm functions to resume its initial position by itself when the pressure diminishes sufficiently, while a bi-stable snap action diaphragm usually requires the use of a reversing force.

The pressure limiting valve assembly is described as being mounted in an air passageway; this includes the embodiments wherein it forms an extension of the air passageway.

BRIEF DESCRIPTION OF THE DRAWINGS

Having thus generally described the invention, reference will be made to the accompanying drawings illustrating embodiments thereof, in which.

DESCRIPTION OF THE PREFERED EMBODIMENTS

Figure 1:
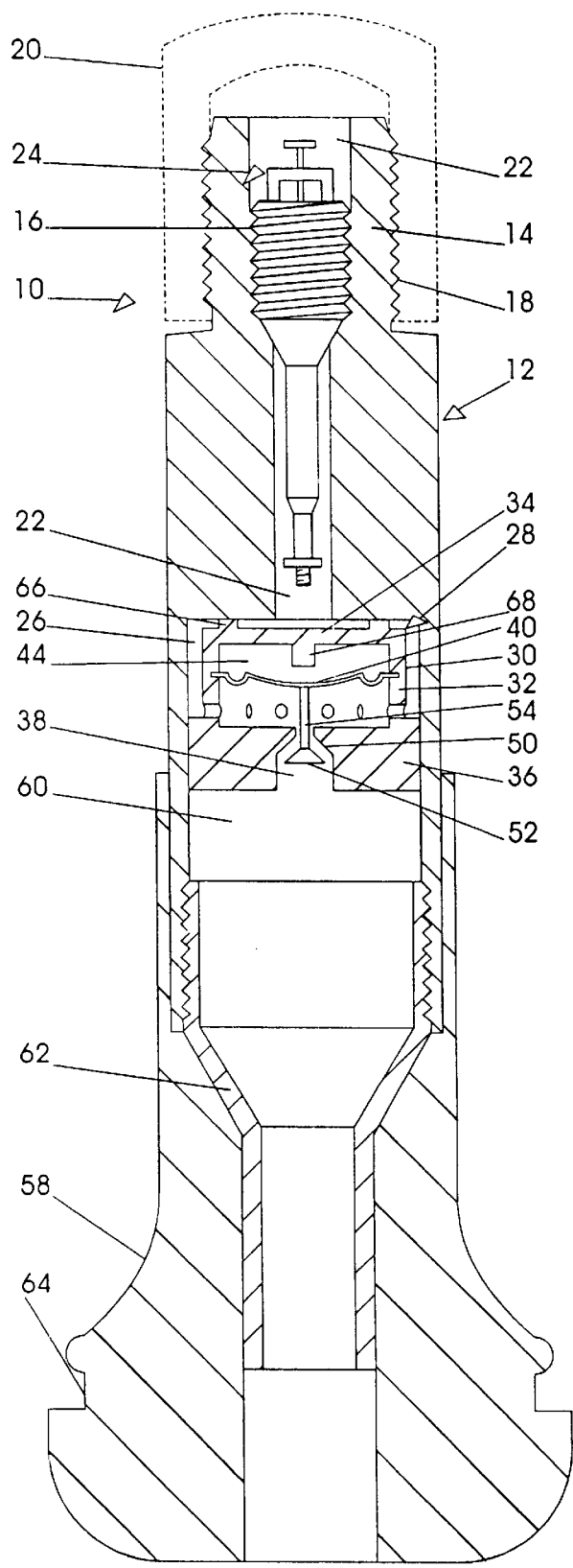
FIG. 1 is a cross sectional view of one embodiment of a valve assembly according to the present invention showing a single position snap action diaphragm in an open position.

Referring to the drawings in greater detail and by reference characters thereto, there is illustrated in FIG. 1 a pneumatic tire valve assembly which is generally designated by reference numeral 10.

Pneumatic tire valve assembly 10 has a housing 12 of a generally cylindrical configuration and which has a recessed upper body portion 14. Upper body portion 14 includes a plurality of exterior screw threads 18 and internal vertical bore 22 surrounded by interior screw threads 16. Valve assembly 10 includes a cap 20 screw threadably engaged with exterior screw threads 18.

Mounted in vertical bore 22 is a conventional tire stem valve 24. Such stem valves are well known in the art and need not be described herein.

Situated below tire stem valve 24 is a pressure limiting valve assembly generally designated by reference numeral 28. Pressure limiting valve assembly 28 is in the form of a generally cylindrical member 30 having a side wall 32, a top wall 34 and a bottom wall 36. An aperture 38 extends through bottom wall 36.

Figure 2:
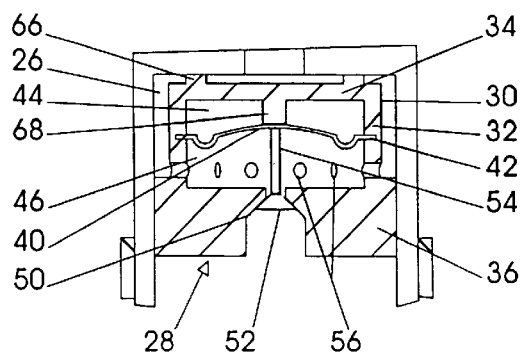
FIG. 2 is a sectional view of the pressure limiting valve of FIG. 1 in a closed position.

Mounted inwardly of cylindrical member 30 of FIG. 1 and 2 is a single stable position snap action diaphragm 40 having a seating flange 42 suitably mounted in side wall 32. Snap action diaphragm 40 divides cylindrical member 30 into an upper closed chamber portion 44 and a lower open chamber portion 46.

Mounted within upper closed chamber portion 44 are limiting means 68 to limit the movement of the snap action diaphragm 40 and protect it.

Aperture 38 in bottom wall 36 is defined by a valve seat generally designated by reference numeral 50; there is also provided a valve member 52 having a valve stem 54, which valve stem 54 is connected to the center of the snap action diaphragm 40 in open chamber portion 46. Valve member 52 is designed to seat on valve seat 50.

An air passageway 26 extends between vertical bore 22 and a plurality of inlet apertures 56 formed in side wall 32 at the level of open chamber portion 46. In other words, there is provided fluid communication between vertical bore 22 and lower open chamber portion 46. The height of spacing pins 66 on wall 34 defines the height of the air passageway 26.

Situated at the lower end of valve assembly 10 is a lower body portion generally designated by reference numeral 62 and which is tightly sealed and solidly engaged with housing 12. A lower air passageway 60 extends between aperture 38 and a tire interior.

Located adjacent lower body portion 62 is a rim seating portion 58 which is arranged in a substantially conventional manner with an annular recess 64 for seating on a rim (not shown) of a conventional wheel.

In operation, when cap 20 is removed, air may be inserted through tire stem valve 24 from which it flows through air passageway 26 and inlet apertures 56 into open lower chamber portion 46. From there, the pressurized air will flow through aperture 38 to lower air passageway 60 and hence to the pneumatic tire.

When a preset pressure limit is reached, the pressure will be exerted on the lower side of the single stable position snap action diaphragm 40 causing the same to reverse direction to the position shown in FIG. 2 wherein valve member 52 seats on valve seat 50 to close aperture 38. Subsequently, no further air pressure can be applied to the pneumatic tire during inflation.

When the air pressure diminishes sufficiently, the single stable position snap action diaphragm 40 will reverse automatically and air once more may flow through to the pneumatic tire.

It will be noted that upper closed chamber portion 44 is not subjected to any exterior environmental effects and thus the accuracy of the preset pressure limit can be maintained.

Also, the arrangement is such that valve member 52 seats on valve seat 50 prior to the full reversal of the single stable position snap action diaphragm 40.

In these embodiments, as in subsequent embodiments, similar reference numerals are employed for similar type of components.

Figure 3:
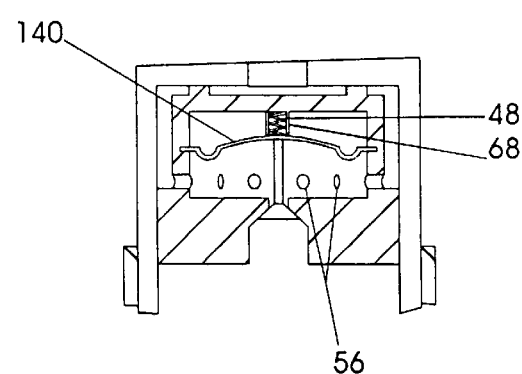
FIG. 3 is a sectional view similar to FIG. 2 showing, in a closed position, a bi-stable snap action diaphragm with a spring.

In FIG. 3, there is shown an embodiment with a negative pressure limiting valve assembly in a closed position, containing limiting means to limit the movement of the snap action diaphragm, with a predetermined resistance spring 48 to bias a bi-stable snap action diaphragm 140.

Figure 4:
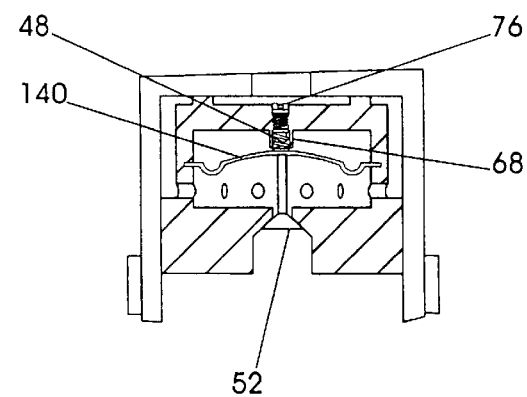
FIG. 4 is a view similar to FIG. 3 with means for adjusting the spring.

FIG. 4 shows an arrangement similar to FIG. 3, containing limiting means 68 to limit the movement of the snap action diaphragm 140 and having a screw adjustable predetermined resistance spring 48 to bias the bi-stable snap action diaphragm 140. This is an arrangement wherein an adjusting screw 76 is provided in top wall 34 and access may be had thereto upon removal of tire stein valve 24. This provides the added advantage of preventing ingress of dirt or other contaminants near adjusting screw 76.

Figure 5:
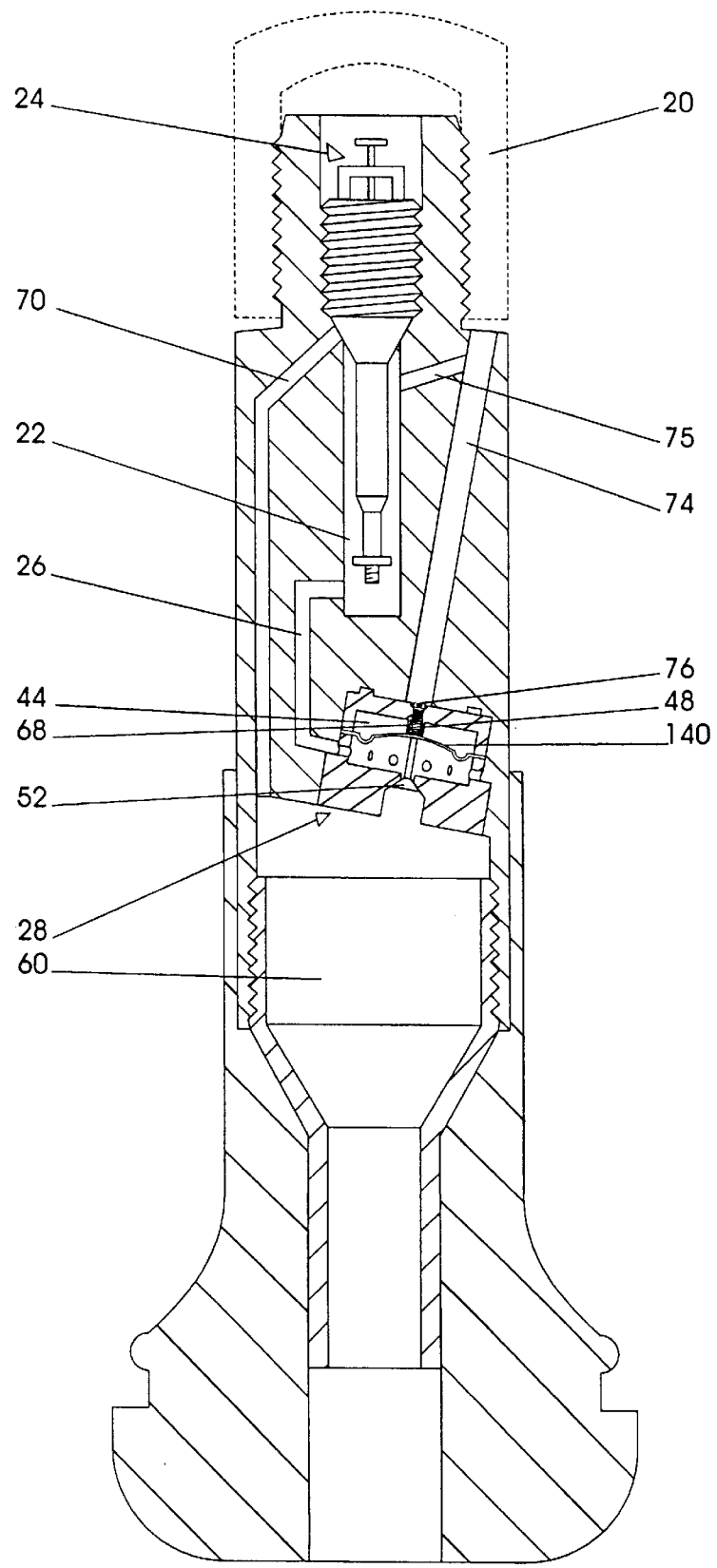
FIG. 5 is a cross sectional view of a further embodiment of a valve assembly according to the present invention, showing a negative pressure limiting valve assembly in a closed position and incorporating a bypass conduit.

FIG. 5 is a cross sectional view of a further embodiment of a valve assembly showing a negative pressure limiting valve assembly when in a closed position. The embodiment includes limiting means 68 to limit the movement of snap action diaphragm 140.

In this arrangement shown, there is provided a bypass air passageway 70 which extends between lower air passageway 60 and vertical bore 22 thus effectively permitting a user bypass pressure limiting assembly 28.

This arrangement may be utilized when it is desired to quickly inflate a tire such as in instances wherein it is necessary to seat the tire bead on the rim of the wheel, when the level of the limiting pressure valve assembly is too low to permit it, or when a greater air flow is desired. To this end, tire stem valve 24 may be removed from vertical bore 22 and the air pressure applied. Once the tire set in place, inside air pressure must diminish at least below the predetermined pressure level. Subsequently, tire stem valve 24 will be reinserted to seal the upper end of bypass air passageway 70 and the device will function in a manner similar to that aforementioned.

This embodiment also shows a variation wherein there is provided a slightly offset conduit 74 communicating between closed chamber portion 44 and a position just below cap 20, which covers the external end of the conduit. A screw member 76 is provided at the bottom of conduit 74 and spring 48 seats thereon. Thus, screw 76 permits the adjustment of the spring pressure against the snap action diaphragm 140 such that the pressure at which the snap action diaphragm reverses may be adjusted. The adjustment of the snap action is possible even when the valve assembly is set in place.

A conduit 75 extends outwardly from the air passageway; conduit 75 will cause the air to emit a whistling sound when air is no longer entering the tire.

Figure 6:
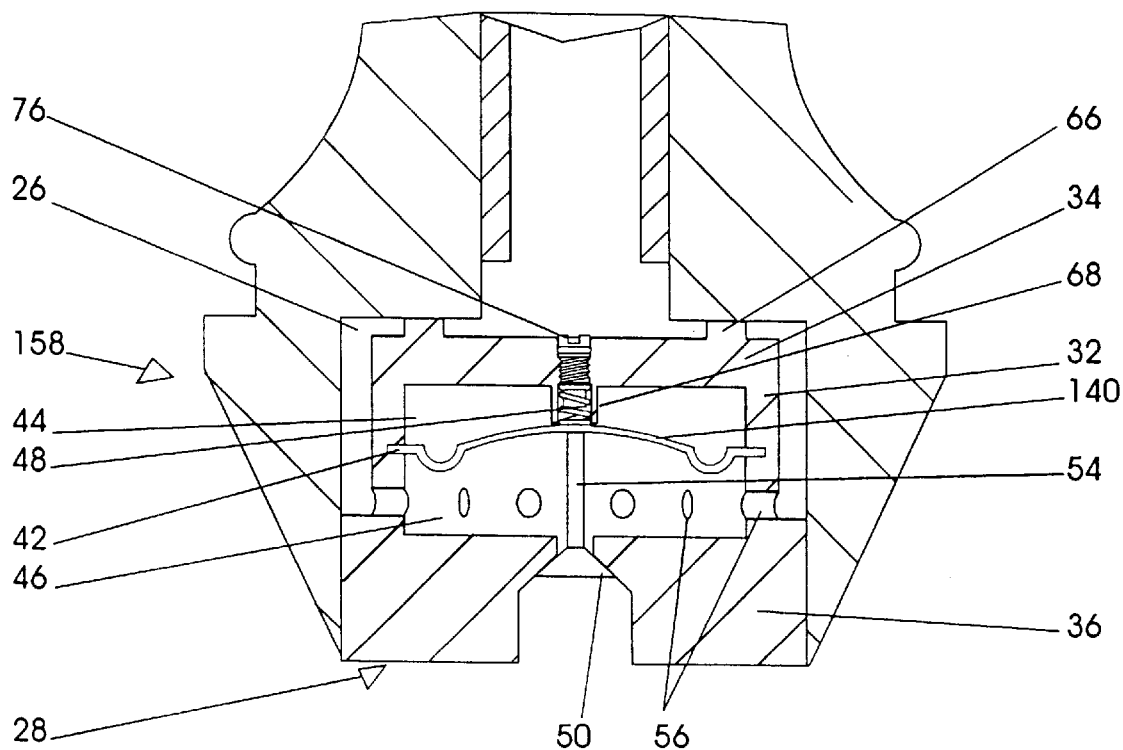
FIG. 6 is a cross sectional view of a further embodiment of a negative pressure limiting valve assembly with an adjustable predetermined resistance spring mounted under a base modified conventional tire valve.

FIG. 6 illustrates a negative pressure limiting valve assembly 28 containing means 68 to limit the movement of the snap action diaphragm 140, with a screw adjustable predetermined resistance spring 48 added under a base modified conventional tire valve. The valve assembly 28 is formed as a separate unit to be mounted to rim seating portion 158 inwardly of a tire. In this case, a part of the base modified valve is used as the external wall of the air passageway 26.

Figure 7:
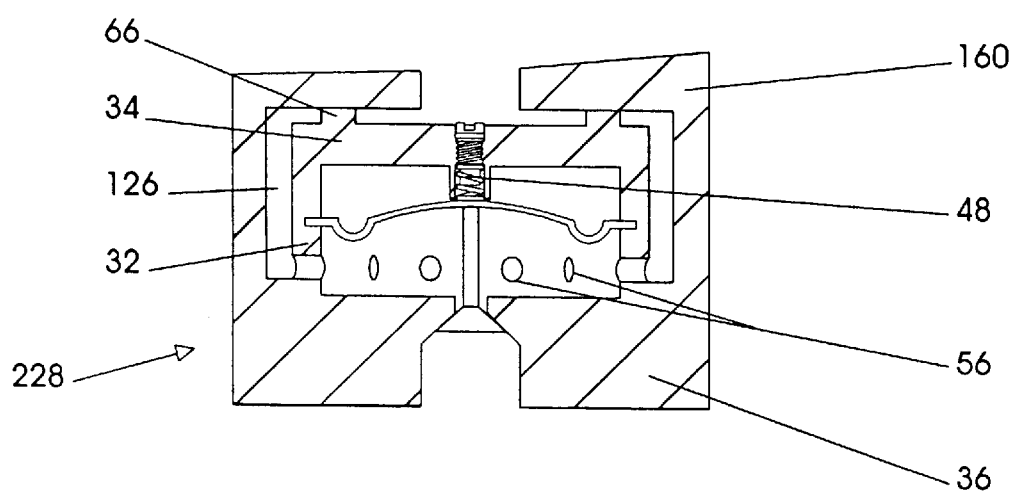
FIG. 7 is a cross sectional view of a stand-alone negative pressure limiting valve assembly having a contained air passageway within.

FIG. 7 shows a stand-alone negative pressure limiting valve assembly 228 having a contained air passageway 126 within, extending between interior walls 32, 34 and 36 and an exterior wall 160 with a screw adjustable predetermined resistance spring 48 to bias a bi-stable snap action diaphragm.

Figure 8:
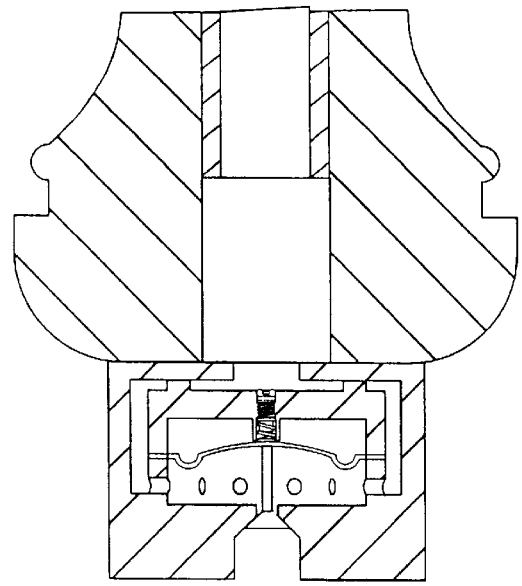
FIG. 8 is a cross sectional view of the stand-alone negative pressure limiting valve assembly of FIG. 7, mounted under a conventional tire valve.

In FIG. 8, the negative pressure limiting valve assembly of FIG. 7 is mounted under a conventional tire valve.

Figure 9:
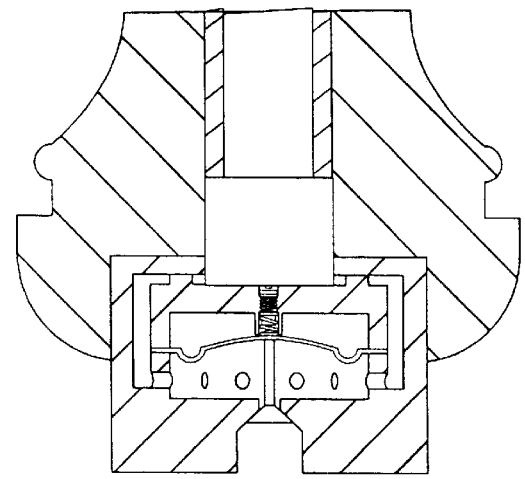
FIG. 9 is a cross sectional view of the stand-alone negative pressure limiting valve assembly of FIG. 7, mounted under a base modified conventional tire valve.

In FIG. 9, the negative pressure limiting valve assembly of FIG. 7 is shown mounted under a base modified conventional tire valve, according to the present invention.

Figure 10:
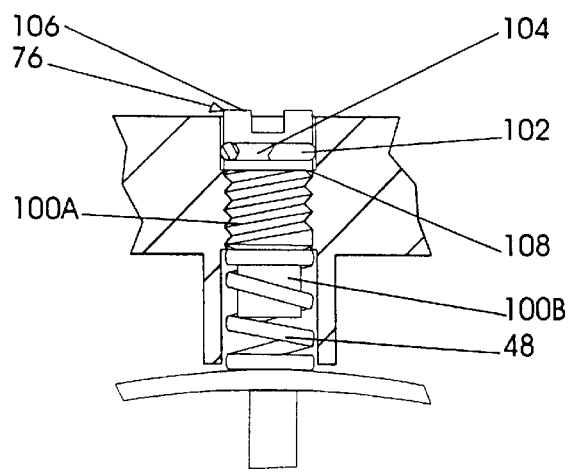
FIG. 10 is an enlarged sectional view of the predetermined resistance spring adjusting screw.

FIG. 10 illustrates a portion of the pressure limiting valve assembly showing the spring adjusting screw 76. Screw 76 consists of a slotted head 106 permitting adjustments with a conventional tool, the head having a groove 104 to hold a sealing o-ring 102 between itself and surrounding wall. Bottom 108 limits its maximum displacement. Under head 106 is a threaded shrinked shank 100a, followed by a second shrink 100b permitting the seating and the guiding of the spring 48; the screwing or unscrewing of the screw biases the spring which biases the snap action diaphragm, to modify the effective point of the limiting valve engaging.

FIGS. 11 to 16 illustrate arrangements of a positive pressure limiting valve assembly. In these embodiments, as in previous embodiments, similar reference numerals are employed for similar types of components; it will be noted that inlet apertures 56 are now outlet apertures 156, outlet aperture 38 becomes inlet aperture 138, bottom wall 36 becomes top wall 136, and top wall 34 becomes bottom wall 134.

In the embodiment of FIGS. 11 to 16, the position of the negative pressure limiting valve assembly 28 is now reversed (positive) and designated by reference numeral 128. Pressure limiting valve assembly 128 is of the type described previously but inverse thereto, the open chamber portion 46 being in the upper position while closed chamber portion 44 is in the lower position.

As may be seen, vertical bore 22 is in direct communication with open chamber portion 46 with valve member 52 designed to seat on valve seat 50 upon an action of the snap action diaphragm 40. Outlet apertures 156 extend between open chamber portion 46 and lower air passageway 60. The valve assembly 128 includes a single stable position snap action diaphragm 40.

Figures 11, 12, 13, 14:
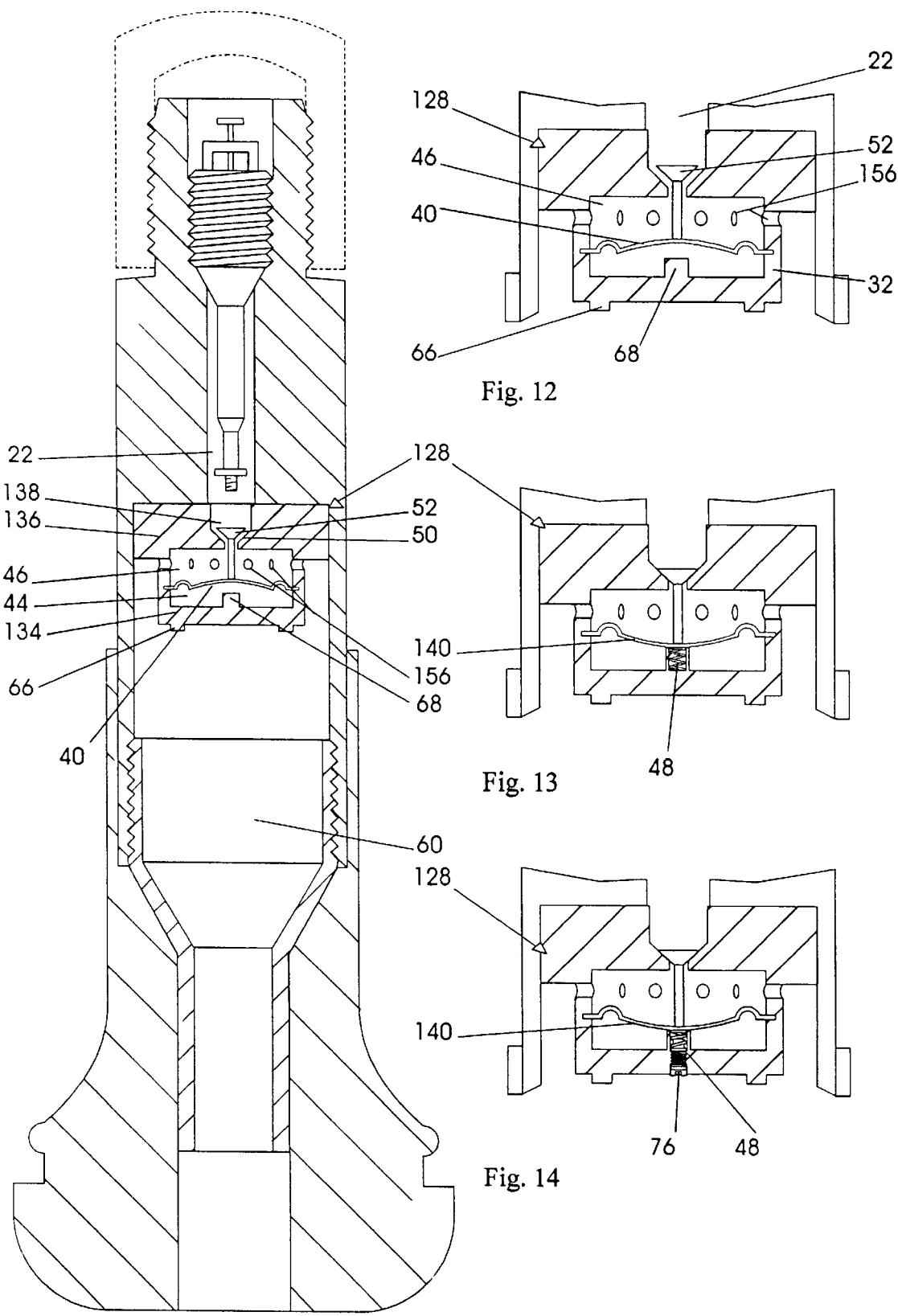
FIG. 11 is a cross sectional view of one embodiment of a valve assembly using a single position snap action diaphragm.
FIG. 12 is a view of the diaphragm of FIG. 11 in a closed position.
FIG. 13 is a view similar to FIG. 12 with a bi-stable snap action diaphragm and spring.
FIG. 14 is a view similar to FIG. 13 showing a screw adjustable predetermined resistance spring.

In FIG. 12, the positive pressure limiting valve assembly 128 of FIG. 11 is shown with diaphragm 40 in a closed position.

In FIG. 13, the positive pressure limiting valve assembly 128 of FIG. 11 is shown in a closed position, with a predetermined resistance spring 48 and a bi-stable position snap action diaphragm 140.

FIG. 14 is a view similar to FIG. 13 of the positive pressure limiting valve assembly 128 when in a closed position, with a screw 76 to adjust predetermined resistance spring 48.

Figure 15:
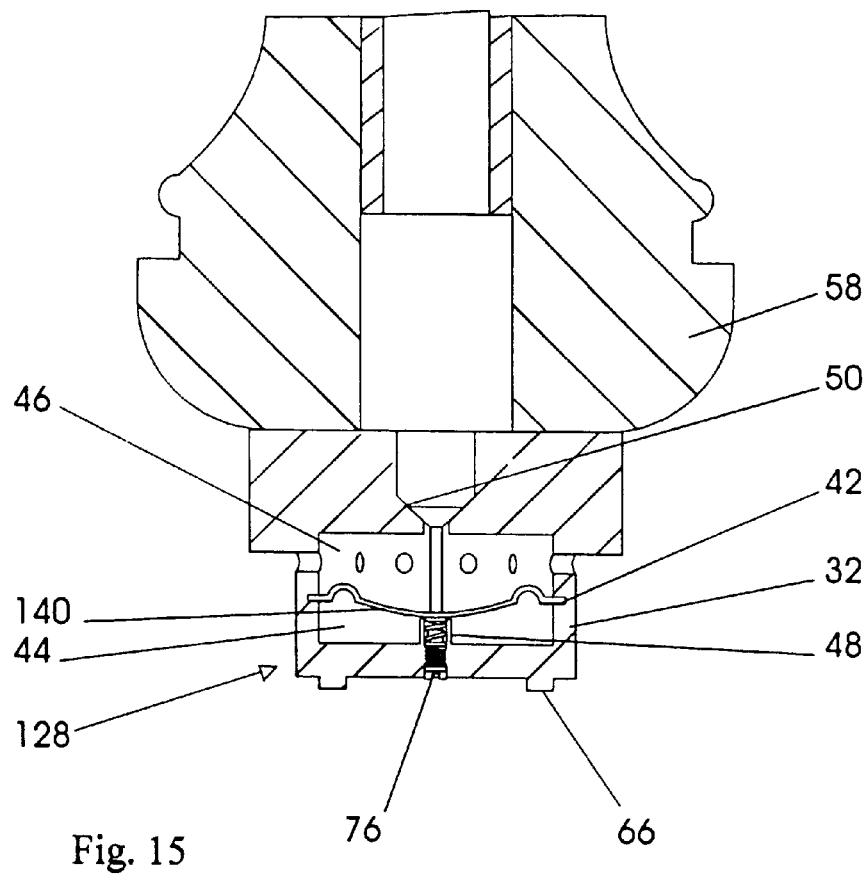
FIG. 15 is a cross sectional view of a positive pressure limiting valve assembly when in a closed position, with a screw adjustable predetermined resistance spring mounted under a conventional tire valve.

FIG. 15 shows a positive pressure limiting valve assembly 128 added under a conventional tire valve. Pressure limiting valve assembly 128 is formed as a separate unit and mounted to rim seating portion 58 under a conventional tire valve.

Figure 16:
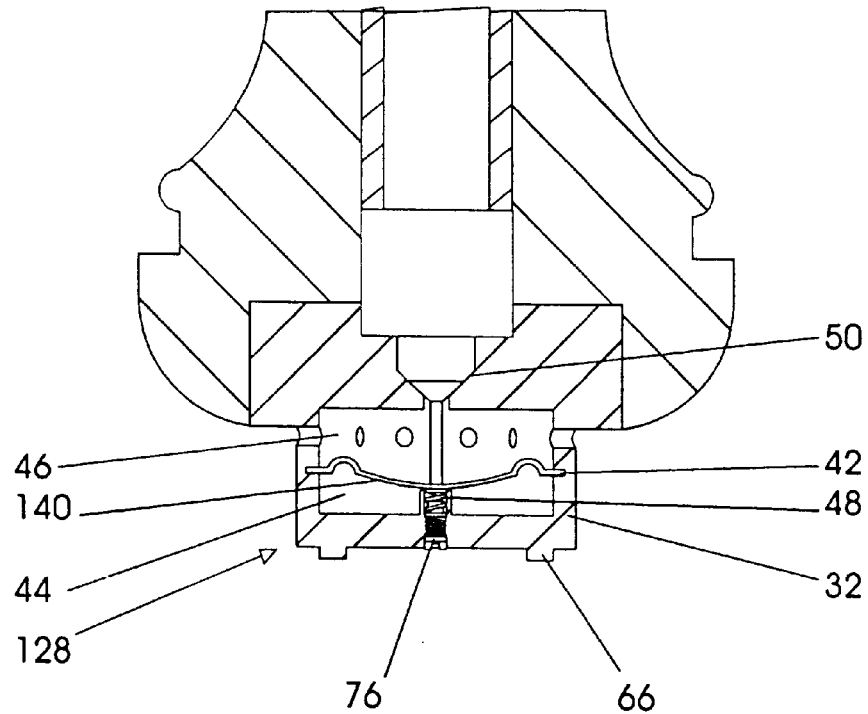
FIG. 16 is a cross sectional view of a positive pressure limiting valve assembly when in a closed position, with a screw adjustable predetermined resistance spring mounted under a base modified conventional tire valve.

In FIG. 16, positive pressure limiting valve assembly 128 is shown mounted under a base modified conventional tire valve.

Figure 17:
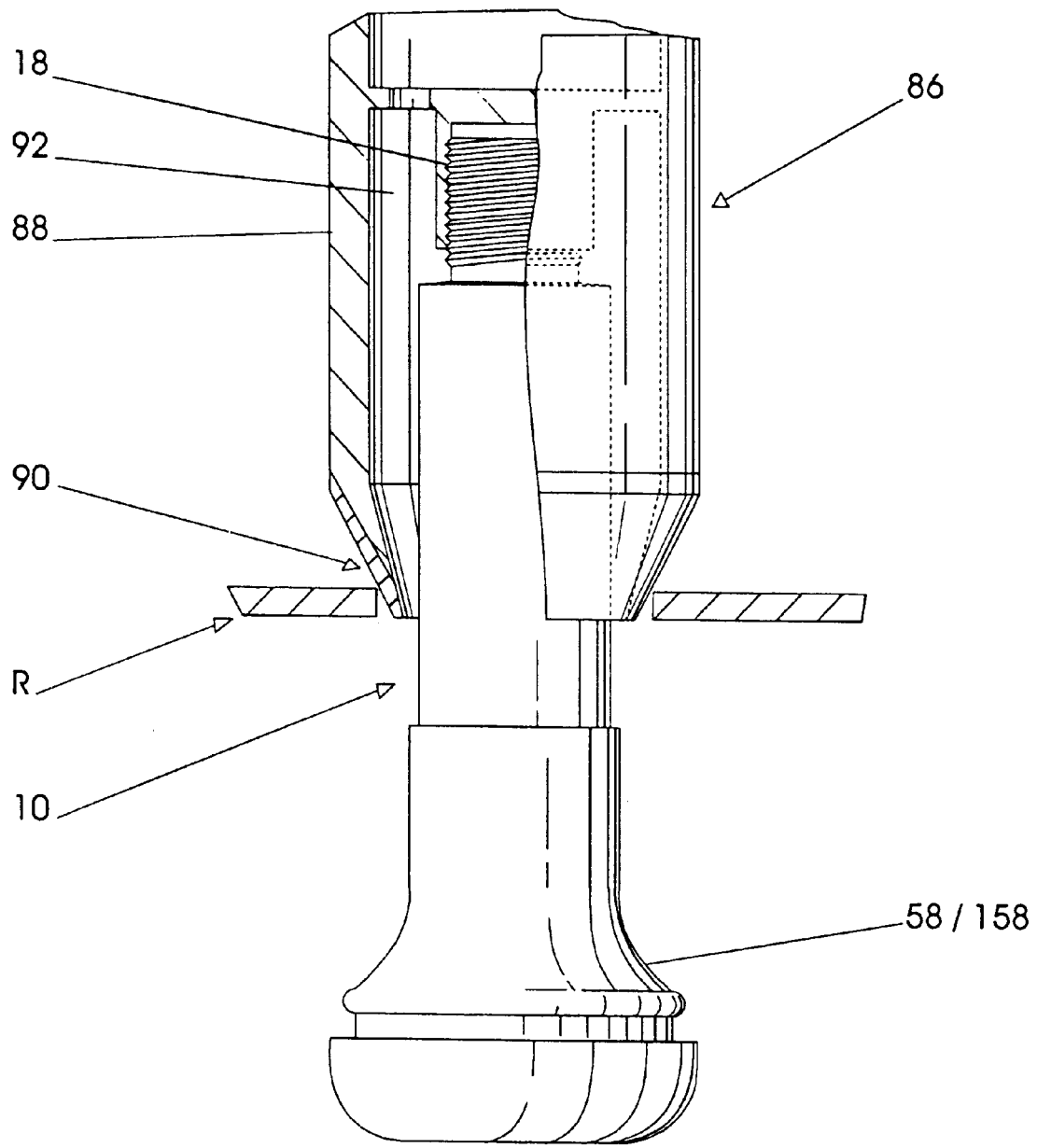
FIG. 17 is a side elevation view, partially in cutaway, of a valve assembly-engaging tool according to the present invention.

FIG. 17 illustrates a valve assembly-engaging tool in conjunction with the valve assembly according to the present invention.

The insertion tool is generally designated by reference numeral 86 and includes a portion which is screw threadably engageable with screw threads 18, and air passageway 92 for incoming air. Insertion tool 86 also includes a cylindrical wall 88 having an inwardly tapered end wall 90.

The tool has two functions: firstly, to hold the valve which is screwed to it, the valve being unseated and held through the hole of the rim, and secondly to let the air from air supply pass into the tire via the inner tool air passageway 92, without passing through the valve. This is useful when the level of the limiting pressure valve assembly is too low to permit the seating of the bead of the tire on the rim, or when a greater air flow is desired.

In operation, the tool is utilized to hold the valve within the rim, while incoming air from air supply passes through the tool, which is pressed on its other end against the rim, and enters the tire to set the tire bead in place, permitting one to bypass the pressure limiting valve assembly of the valve. Once the tire set in place, withdrawing the tool from the rim lets the air escape under the predetermined pressure of the valve, allowing the tool to perform its second use: namely, to be used to pull the valve in place. When done, one simply has to unscrew the tool and inflate the tire the ordinary way.

Figures 18, 19:
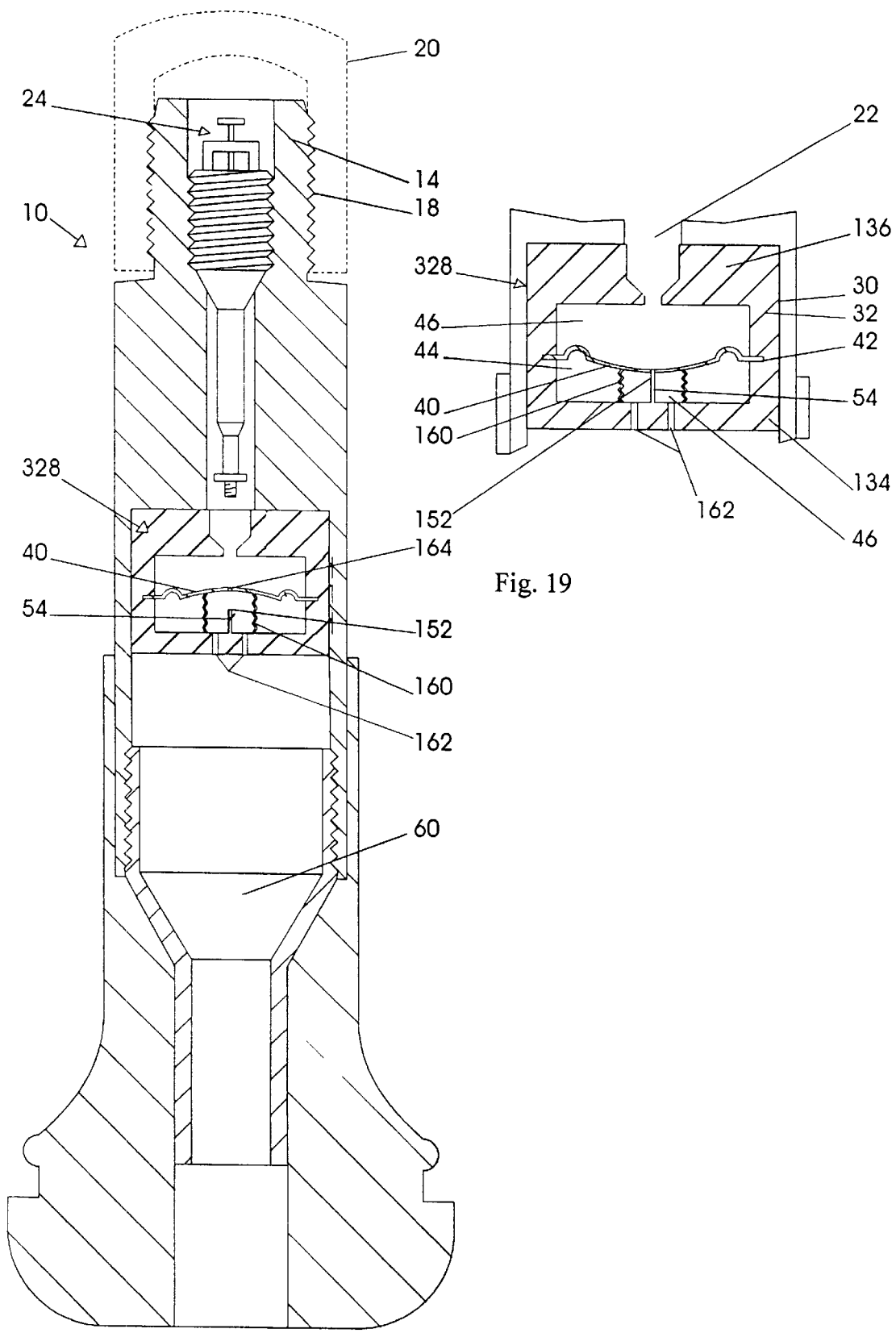
FIG. 18 is a cross sectional view of a further embodiment of a valve assembly according to the present invention using a single position center drilled snap action diaphragm.
FIG. 19 is a detail view of the pressure limiting valve assembly of FIG. 18 in a closed position.

Turning to the embodiments of FIGS. 18 and 19, situated below tire stem valve 24 is a pressure limiting valve assembly generally designated by reference numeral 328. Pressure limiting valve assembly 328 is in the form of a generally cylindrical member 30 having a side wall 32, a top wall 136 and a bottom wall 134. Outlet apertures 162 extend through bottom wall 134.

Mounted inwardly of cylindrical member 30 is a center drilled snap action diaphragm 40 extending across the chamber and having a seating flange 42 suitably mounted in side wall 32. A center aperture 164 serves as air inlet. Surrounding outlet apertures 162, and stem mounted valve member 152 affixed to bottom wall 134 is an air-tight sealing bellows 160 air-tightly fixed around the center inlet hole of the center drilled snap action diaphragm and to bottom wall 134 around outlet apertures 162.

The center drilled one stable position snap action diaphragm 40, in conjunction with sealing bellows 160 divides cylindrical member 30 into a closed chamber portion 44 and an open chamber portion 46. In other arrangements, a center drilled bi-stable snap action diaphragm 140 can be used with appropriate means.

The inlet center hole 164 of the center drilled snap action diaphragm 40 is designed to seat air-tightly on valve member 152; this valve member 152 has a valve stem 54, which valve stem 54 is fixed to the bottom wall 134. Also, there is provided fluid communication between vertical bore 22 and open chamber portion 46.

Valve member 152 is designed to seat air-tightly center hole 164, when the pressure limiting valve assembly is in a closed position.

In operation, when cap 20 is removed, air may be inserted through tire stem valve 24 from which it flows through vertical bore 22 and inlet center hole 164 into open chamber portion 46. From there, the pressurized air will flow through aperture 162 to lower air passageway 60 and hence to the pneumatic tire.

When a preset pressure limit is reached, the pressure will be exerted on the upper side of center drilled snap action diaphragm 40 causing the same to reverse direction to the position shown in FIG. 2 wherein valve member 152 air-tightly seats the inlet center hole 164 to close the pressure limiting valve assembly. Subsequently, no further air pressure can be applied to the pneumatic tire.

When the air pressure falls below the preset level, center drilled snap action diaphragm 40 will reverse automatically and air once more may flow through to the pneumatic tire.

It will be noted that closed chamber portion 44 is not subjected to any exterior environmental effects and thus the accuracy of the preset pressure limit can be maintained. Also, the arrangement is such that the inlet center hole 164 seats on valve member 152 prior to the full reversal of center drilled snap action diaphragm 40.

It is understood that the above described embodiments and arrangements are for purposes of illustration only and that changes and modifications or various combinations may be made thereto without departing from the spirit and scope of the invention.

We claim:

1. A pneumatic valve assembly comprising:
   a housing having an air passageway extending therethrough;
   a tire stem valve mounted in an upper portion of said air passageway;
   a pressure limiting valve assembly mounted in said air passageway downstream from said tire stem valve, said pressure limiting valve assembly comprising:
   a chamber having an upstream air inlet from said air passageway;
   a downstream air outlet from said chamber to said air passageway;
   a valve seat surrounding one of said air outlet and air inlet;
   a valve member seatable on said valve seat;
   a snap action diaphragm extending across said chamber and dividing said chamber into a first open chamber portion and a second closed chamber portion;
   said first open chamber portion having said air inlet and said air outlet;
   a valve stem connected to said valve member and to said snap action diaphragm;
   biasing means mounted in said second chamber portion to bias said snap action diaphragm towards said first chamber portion;
   means to adjust said biasing means to thereby adjust a biasing force exerted on said snap action diaphragm; and
   said means to adjust said biasing means being accessible by means of a conduit extending between said means to adjust said biasing means and an exterior of said housing.

2. The valve assembly of claim 1 wherein said snap action diaphragm is a bi-stable snap action diaphragm.

3. The valve assembly of claim 1 wherein said biasing means comprises a biasing spring.

4. The valve assembly of claim 3 wherein said adjustment means comprises screw adjustment means.

5. The valve assembly of claim 1 further including a valve cap surrounding an upper portion of said chamber, said valve cap sealing said conduit.

6. The valve assembly of claim 1 wherein said housing further includes an annular groove extending thereabout, said annular groove being designed to seat within a wheel rim.

7. The valve assembly of claim 1 wherein said snap action diaphragm comprises a single stable position snap action diaphragm.

8. A pneumatic valve assembly comprising:
   a housing having an air passageway extending therethrough;
   a tire stem valve mounted in an upper portion of said air passageway;
   a pressure limiting valve assembly mounted in said air passageway downstream from said tire stem valve, said pressure limiting valve assembly comprising:

a chamber having an upstream air inlet from said air passageway;

a downstream air outlet from said chamber to said air passageway;

a valve seat surrounding one of said air outlet and air inlet;

a valve member seatable on said valve seat;

a snap action diaphragm extending across said chamber and dividing said chamber into a first open chamber portion and a second closed chamber portion;

said first open chamber portion having said air inlet and said air outlet;

a valve stem connected to said valve member and to said snap action diaphragm; and limiting means within said closed chamber portion to limit the maximum movement of said snap action diaphragm.

9. A pneumatic valve assembly comprising:

a housing having an air passageway extending therethrough;

a tire stem valve mounted in an upper portion of said air passageway;

a pressure limiting valve assembly mounted in said air passageway downstream from said tire stem valve, said pressure limiting valve assembly comprising:

a chamber having an upstream air inlet from said air passageway;

a downstream air outlet from said chamber to said air passageway;

a valve seat surrounding one of said air outlet and air inlet;

a valve member seatable on said valve seat;

a snap action diaphragm extending across said chamber and dividing said chamber into a first open chamber portion and a second closed chamber portion;

said first open chamber portion having said air inlet and said air outlet;

a valve stem connected to said valve member and to said snap action diaphragm; and a bypass air passageway extending between a position upstream of said pressure limiting valve assembly and a position downstream thereof.

10. A pneumatic valve assembly comprising:

a housing having an air passageway extending therethrough;

a tire stem valve mounted in an upper portion of said air passageway;

a pressure limiting valve assembly mounted in said air passageway downstream from said tire stem valve, said pressure limiting valve assembly comprising:

a chamber having an upstream air inlet from said air passageway;

a downstream air outlet from said chamber to said air passageway;

a valve seat surrounding one of said air outlet and air inlet;

valve member seatable on said valve seat;

a snap action diaphragm extending across said chamber and dividing said chamber into a first open chamber portion and a second closed chamber portion;

said first open chamber portion having said air inlet and said air outlet;

a valve stem connected to said valve member and to said snap action diaphragm;

biasing means mounted in said second chamber portion to bias said snap action diaphragm towards said first chamber portion;

means to adjust said biasing means to thereby adjust a biasing force exerted on said snap action diaphragm and wherein said means to adjust said biasing means are located on a top portion of said pressure limiting valve assembly such that access may be had thereto upon removal of said tire stem valve mounted in said air passageway.

11. The valve assembly of claim 1 wherein said pressure limiting valve assembly comprises a stand-alone unit mountable within said air passageway.

12. The valve assembly of claim 1 wherein said pressure limiting valve assembly is mounted at an end of said passageway which extends within a pneumatic tire rim.

13. A pneumatic valve assembly comprising:

a housing having an air passageway extending therethrough;

a tire stem valve mounted in an upper portion of said air passageway;

a pressure limiting valve assembly mounted in said air passageway downstream from said tire stem valve, said pressure limiting valve assembly comprising a chamber having an upstream air inlet from said air passageway;

a downstream air outlet from said chamber to said air passageway, a snap action diaphragm extending across said chamber and dividing said chamber into a first upper chamber portion and a second lower chamber portion, said diaphragm having at least one aperture located centrally thereof to permit gas communication between said first upper chamber and said second lower chamber;

means within said second lower chamber for sealing said at least one aperture when said snap action diaphragm moves into a position within said second lower chamber; and bellow means enclosing an air passageway extending between said at least one aperture and said downstream air outlet.

14. The valve assembly of claim 13 wherein said snap action diaphragm comprises a single stable position diaphragm.

15. The valve assembly of claim 1 wherein said valve seat surrounds said air outlet.

16. The valve assembly of claim 1 wherein said valve seat surrounds said air inlet.

17. The valve assembly of claim 9 wherein said tire stem valve seals an upper entry to said bypass air passageway.

* * * * *